United States Patent
Gam et al.

(10) Patent No.: US 7,264,705 B2
(45) Date of Patent: Sep. 4, 2007

(54) CATHODIC ELECTROCOATING COMPOSITIONS CONTAINING AN ANTI-CRATER AGENT

(75) Inventors: Allisa Gam, Troy, MI (US); Thomas Grawe, Leverkusen (DE); Joachim Ruerup, Helmstedt (DE); Andreas Fieberg, Duesseldorf (DE)

(73) Assignee: E. I. duPont de Nemours and Company, Wilmington, DE (US)

( * ) Notice: Subject to any disclaimer, the term of this patent is extended or adjusted under 35 U.S.C. 154(b) by 126 days.

(21) Appl. No.: 10/967,439

(22) Filed: Oct. 18, 2004

(65) Prior Publication Data

US 2006/0084725 A1    Apr. 20, 2006

(51) Int. Cl.
*C25D 9/02* (2006.01)
*C08L 63/00* (2006.01)
*C08G 63/00* (2006.01)

(52) U.S. Cl. .................. 205/317; 523/402; 523/414; 523/415; 525/528; 525/533; 528/68; 528/335; 528/340; 528/367

(58) Field of Classification Search ............... None
See application file for complete search history.

(56) References Cited

U.S. PATENT DOCUMENTS

| | | | |
|---|---|---|---|
| 3,922,253 A | 11/1975 | Jerabek et al. | |
| 4,137,140 A | 1/1979 | Belanger | |
| 4,419,467 A | 12/1983 | Wismer et al. | |
| 4,468,307 A | 8/1984 | Wismer et al. | |
| 4,612,132 A * | 9/1986 | Wollenberg et al. | 508/291 |
| 4,746,446 A * | 5/1988 | Wollenberg et al. | 508/192 |
| 4,747,850 A * | 5/1988 | Wollenberg et al. | 44/330 |
| 4,747,965 A * | 5/1988 | Wollenberg et al. | 508/291 |
| 4,802,893 A * | 2/1989 | Wollenberg et al. | 508/192 |
| 4,904,278 A * | 2/1990 | Wollenberg et al. | 44/348 |
| 4,927,551 A * | 5/1990 | Erdman et al. | 508/291 |
| 5,348,578 A | 9/1994 | Le Disert et al. | |
| 5,356,960 A * | 10/1994 | Chung et al. | 523/404 |
| 5,723,519 A | 3/1998 | Gam et al. | |
| 5,750,596 A * | 5/1998 | Gam | 523/404 |
| 5,789,468 A * | 8/1998 | Chung | 523/417 |
| 5,883,276 A * | 3/1999 | Gam et al. | 556/423 |
| 5,908,910 A * | 6/1999 | Gam | 528/28 |
| 6,207,731 B1 * | 3/2001 | Gam | 523/404 |
| 2002/0046950 A1 | 4/2002 | Klein et al. | |

\* cited by examiner

*Primary Examiner*—Micael J. Feely
(74) *Attorney, Agent, or Firm*—Kevin S. Dobson

(57) ABSTRACT

An improved aqueous cathodic electrocoating composition that contains an anti-crater agent which is a water-reducible polyester resin having an acid value less than 40 mg KOH/g. The water-reducible polyester is the reaction product of (1) a hydroxy cyclic carbonate; (2) a polycarboxylic acid anhydride; (3) optional monofunctional epoxy resin; (4) a polyfunctional isocyanate resin; and, (5) a polyamine compound containing tertiary amine and either primary or secondary functionality. The reaction product is neutralized in the presence of acid and water to convert the tertiary amine groups to water-dilutable groups. Hydrolyzable silane groups can also be incorporated into the reaction product to further enhance its crater resistance property. The electrocoat composition produces coatings having a smoother appearance with fewer craters without adversely affecting intercoat adhesion of the cured film to subsequent coating layers applied thereover.

7 Claims, No Drawings

CATHODIC ELECTROCOATING COMPOSITIONS CONTAINING AN ANTI-CRATER AGENT

FIELD OF THE INVENTION

This invention is directed to a cathodic electrocoating composition and in particular to a cathodic electrocoating composition containing an anti-crater agent, which significantly reduces craters and improves the smoothness of an electrodeposited film of the composition.

BACKGROUND OF THE INVENTION

The coating of electrically conductive substrates by an electrodeposition process also called an electrocoating process is a well-known and important industrial process. Electrodeposition of primers to automotive substrates is widely used in the automotive industry. In this process, a conductive article, such as an autobody or an auto part, is immersed in a bath of a coating composition of an aqueous emulsion of film forming polymer and acts as an electrode in the electrodeposition process. An electric current is passed between the article and a counter-electrode in electrical contact with the aqueous emulsion, until a desired coating is deposited on the article. In a cathodic electrocoating process, the article to be coated is the cathode and the counter-electrode is the anode.

Resin compositions used in the bath of a typical cathodic electrodeposition process also are well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent and then neutralized with an acid to form a water emulsion, which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at sufficient temperature to produce a crosslinked finish on the article.

Cathodic electrocoating compositions, resin compositions, coating baths and cathodic electrodeposition processes are disclosed in Jarabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979 and Wismer et al U.S. Pat. No. 4,468,307 issued Aug. 25, 1984.

A continuing problem with cathodic electrocoating compositions has been the presence of craters in the cured finish. A number of anti-crater agents have been used in the past to eliminate craters. However, the presence of conventional anti-crater agents in electrocoating compositions has had a negative impact on the adhesion of subsequent coating layers applied thereto, such as automotive PVC sealers used for sealing joints and primer surfacers, particularly where the electrocoating film has been cured in an oven without the presence NOx (nitrogen oxides), such as in an indirect gas or electric oven. An additive or agent is needed for electrocoating compositions so that crater-free, smooth and even finishes are formed on electrodeposition and curing, without adversely affecting the adhesion of PVC sealers and primers subsequently applied thereto.

SUMMARY OF THE INVENTION

The present invention is directed to an improved aqueous cathodic electrocoating composition having a binder of an epoxy-amine adduct and a blocked polyisocyanate crosslinking agent; wherein the improvement is the use of an anti-crater agent comprising a highly branched water-reducible polyester having an acid value less than 40 mg KOH/g which is the reaction product of:
1) a hydroxy cyclic carbonate;
2) an aliphatic polycarboxylic acid anhydride;
3) optional monofunctional epoxy resin;
4) a polyfunctional (di- or higher) isocyanate resin; and,
5) a polyamine compound selected from one of the following two groups:
   (i) a polyamine containing a tertiary amine and a primary or secondary amine group, or
   (ii) a combination of a polyamine containing a tertiary amine and a primary or secondary amine group, and an aminoalkylalkoxysilane, which reaction product is neutralized in the presence of acid and water to convert the tertiary amine groups to water-dilutable groups.

Also included within the scope of this invention is an improved process for coating a substrate, such as a vehicle body or part thereof, using the coating composition disclosed herein.

"Water-reducible" or "water-dilutable" as used herein means the material is soluble in water or is dispersible in water after neutralization.

DETAILED DESCRIPTION OF THE INVENTION

The anti-crater agent is readily incorporated into the electrocoating composition since it is compatible with the other constituents of the composition. The anti-crater agent remains stable in the composition and in the electrocoating bath for extended periods of time under conventional bath operating conditions since it is not reactive with the other constituents in the composition. The anti-crater agent significantly reduces and often eliminates craters in electrodeposited coatings and forms smooth and even finishes and the additive does not adversely affect adhesion of subsequent coating layers applied thereover and other properties of the electrocoating bath or finishes of the electrocoating composition.

The anti-crater additive is used in an electrocoating composition in a sufficient amount to significantly reduce or eliminate cratering in the electrodeposited finish. Generally, the anticrater agent is used in the electrocoating composition at a level of at least 0.5% by weight, based on the total weight of binder solids in the electrocoating composition and preferably, it is used at a level of about 0.5-10% by weight. More preferably, about 1-5% by weight of the anti-crater agent is used. The binder of the electrocoating composition is a blend of an epoxy amine adduct and a blocked polyisocyanate crosslinking agent.

The anti-crater agent is prepared by first reacting a hydroxy functional cyclic carbonate with a carboxylic acid anhydride in a conventional manner under conditions sufficient to ring open the anhydride and form adduct with a primary carboxyl group at one terminus and a cyclic carbonate at the other terminus. This reaction is generally conducted at temperature of about 90 to 150 degree C. in the presence of catalyst until the reaction is substantially complete. Examples of the catalysts are triphenylphosphine or ethyltriphenylphosphonium iodide. Preferably for the desired ring opening reaction and formation of an adduct having one primary carboxyl group, a carboxylic acid anhydride is used. Reaction of the hydroxy functional cyclic carbonate with a carboxylic acid instead of an anhydride would require esterification by condensation eliminating water, which would have to be removed by distillation. Under these conditions, this would promote undesired polyesterification, which should be avoided.

The time of reaction can vary somewhat depending principally upon the temperature of reaction. Usually the reaction time will be from as low as 10 minutes to as high as 24 hours.

The equivalent ratio of anhydride to hydroxy on the cyclic carbonate is preferably at least about 0.8:1 to about 1.2:1 (the anhydride being considered monofunctional) to obtain maximum conversion to the desired reaction product, with the ratio of 1:1 being preferred. Ratios less than 0.8:1 can be used but such ratios result in increased formation of less desired polyesterification products.

Among the cyclic carbonates that can be used are those, which contain active hydrogen atoms with one or more hydroxy functional groups. These cyclic carbonates are well known in the art. Examples include hydroxy functional cyclic carbonates of various ring sizes as are known in the art, although five-membered-ring or six-membered-ring cyclic carbonates are generally preferred. Five-membered rings are more preferred, due to their greater degree of commercial availability. Typically useful five-membered cyclic carbonates that contain a hydroxyl group are 1,3-dioxolan-2-one-4-propanol, 1,3-dioxolan-2-one-butanol, 1,3-dioxolan-2-one-pentanol and the like. Typically useful 6-membered cyclic carbonates that contain a hydroxyl group are 1,3-dioxolan-2-one-2,2-diethylpropanol, 1,3-dioxolan-2-one-2,2-dimethylpropanol and the like. A five-membered cyclic carbonate carrying a 1,3-dioxolan-2-one group, such as 1,3-dioxolan-2-one-propanol or commonly called glycerin carbonate is particularly preferred.

Among the anhydrides which can be used in the formation of the ester or carboxyl groups are those, which exclusive of the carbon atoms in the anhydride moiety contain from about 2 to 30 carbon atoms. Examples include aliphatic, including cycloaliphatic, olefinic and cycloolefinic anhydrides and aromatic anhydrides. Substituted aliphatic and aromatic anhydrides are also included within the definition of aliphatic and aromatic provided the substituents do not adversely affect the reactivity of the anhydride or the properties of the resultant polyester. Examples of substituents would be halogen, alkyl and alkoxy groups. Aromatic anhydrides are generally not preferred due to their poor weathering characteristics.

Typically useful aliphatic acid anhydrides are phthalic anhydride, maleic anhydride, succinic anhydride, hexahydrophthalic anhydride, tetrahydrophthalic anhydride, and methylhexahydrophthalic anhydride. Examples of other useful aliphatic acid anhydrides include hexadecenylsuccinic anhydride, octenylsuccinic anhydride, octadecenylsuccinic anhydride, tetradecenylsuccinic anhydride, dodecylsuccinic anhydride, and octadecenylsuccinic anhydride. The latter class of anhydrides are generally preferred since they contain long chain hydrocarbons of at least 4 carbon atoms, preferably of at least 6 to 18 carbon atoms, exclusive of the carbon atoms in the anhydride moiety, which provide for good stability and the proper hydrophilic/hydrophobic balance in the final coating composition. Acid anhydrides such as dodecenylsuccunic anhydride and octadecenylsuccinic anhydride are particularly preferred.

Subsequently, the carboxyl groups formed by ring opening the anhydride ring are optionally, but preferably, chain extended with a monofunctional epoxy resin, particularly a monoglycidyl ether, to convert the carboxyl groups to hydroxyl groups and then with additional acid anhydride to convert the hydroxyl groups back to acid groups. The adduct is preferably chain extended in this manner in order to introduce additional hydrocarbon chains into the molecule for better stability and better hydrophilic/hydrophobic balance.

The monoepoxy compound is as noted above, added after the desired completion of the first reaction. The monoepoxy-acid anhydride chain extension reaction is generally conducted under the same conditions as in the first reaction.

Among the monoglycidyl ethers which can be used in the chain extension reaction are those that have 1,2-epoxy equivalency of about 1, that is, monoepoxides which have on an average basis one epoxy group per molecule. These epoxy compounds can be saturated, unsaturated, aliphatic, cycloaliphatic, aromatic or heterocyclic. They may contain substituents such as halogen, hydroxy, ether, alkyl and/or aryl groups provided the substituents do not adversely affect the reactivity of the adduct or the properties of the resultant polyester.

The preferred monoepoxy compounds are those, which exclusive of the carbon atoms in the epoxy moiety contain from about 4 to 18 carbon atoms. Particularly preferred are monoglycidyl ethers of long chain, i.e., $C_4$ or higher, monohydric alcohols. Representative examples of monoglycidyl ethers that may be used to advantage include alkyl, cycloalkyl, alkylalkoxysilane, aryl and mixed aryl-alkyl-monoglycidyl ethers, such as, o-cresyl glycidyl ether, phenyl glycidyl ether, butyl glycidyl ether, octyl glycidyl ether, dodecyl glycidyl ether, glycidoxypropyltrimethoxysilane, glycidoxypropyltriethoxysilane, 2-ethylhexyl glycidyl ether. 2-Ethylhexyl glycidyl ether or the combination of glycidoxypropyltrimethoxysilane and 2-ethylhexyl glycidyl ether is particularly preferred. Other useful long chain epoxy compounds having one epoxy group will readily occur to one skilled in the art.

Among the acid anhydrides, any of the aforementioned acid anhydrides can be used in the chain extension reaction.

The equivalent ratio of carboxyl to hydroxyl groups in this chain extension reaction is preferably at least about 0.8:1 to about 1.2:1 to obtain maximum conversion to the chain extended adduct, with the ratio of 1:1 being particularly preferred. The reaction wherein the acid groups are converted to hydroxyl groups is carried out until an acid value of less than 20 mg KOH/g is reached; preferably less than 5 mg KOH/g. The subsequent reaction wherein the hydroxyl groups are converted to carboxyl groups is carried out until an acid value is greater than 40 mg KOH/g is reached; preferably greater than 60 mg KOH/g.

In the next step of the synthesis, the carboxyl groups formed on the chain extended or, if desired, non-chain extended adduct are subsequently reacted with a chemical bridging or coupling agent having two or more sites reactive with active hydrogen groups to form a di- or higher adduct (i.e., branched polyester adduct) with terminal cyclic carbonate groups.

The coupling agent is as noted above, added late in the resin reaction sequence when essentially all of the previous reactants have reacted.

The level of chemical coupling agent is primarily selected, relative to the carboxyl groups, to secure an acid number in the range of 0 to 10, for each 100 grams of resin, to provide the best balance of water solubilization and low excess carboxyl value.

The reaction with coupling agent is carried under the same conditions as used above and proceeds until the desired acid level is obtained.

The chemical coupling agents used to form the anti-crater agent include polyfunctional isocyanate resins, which have on an average basis two or more isocyanate groups per molecule.

Any of the conventionally used aromatic, aliphatic or cycloaliphatic monomeric, polymeric or prepolymer polyfunctional (i.e., difunctional or higher) isocyanate resins can be used without particular limitation so long as the isocyanate compound has at least two isocyanate groups in the one molecule. The preferable isocyanate compounds are isocyanate compounds having on average 2 to 6 isocyanate groups per molecule, with 2 to 3 isocyanate groups being especially preferred.

Typical examples of monomeric isocyanate compounds are, for instance, 1,6-hexamethylene diisocyanate, isophorone diisocyanate, 2,4-toluene diisocyanate, diphenylmethane-4,4'-diisocyanate, dicyclohexylmethane-4,4'-diisocyanate, tetramethylxylylene diisocyanate, and the like. Typical examples of polymeric isocyanate compounds are isocyanurate of 1,6-hexamethylene diisocyanate, biuret of 1,6-hexamethylene diisocyanate, uretdione of 1,6-hexamethylene diisocyanate, isocyanurate of isophorone diisocyanate, biuret of isophorone diisocyanate, uretdione of isophorone diisocyanate, isocyanurate of diphenylmethane-4, 4'-diisocyanate and polymeric diphenylmethane diisocyanate.

Prepolymer isocyanate compounds can also be used that are formed from any of the forgoing organic polyisocyanate and a polyol. Polyols such as polyoxypropylene ethers of glycerol, trimethylolpropane, 1,2,6-hexanetriol, sorbitol can be used. One useful adduct is the reaction product of tetramethylxylylene diisocyanate and trimethylolpropane. The use of an aromatic isocyanates is preferable to the use of an aliphatic or cycloaliphatic isocyanate, for better emulsion stability, electrocoat appearance and corrosion resistance. The most preferred aromatic isocyanate compound is the mixture of monomeric and polymeric of diphenylmethane diisocyanate, such as Mondur® MR commercially available from Bayer Corporation.

The terminal cyclic carbonate groups on the di- or higher branched polyester adduct are then reacted in a subsequent reaction with a polyamine compound that contains at least one free tertiary amine group and also additionally contains a primary amine or secondary amine group, to form the final branched polyester-amine adduct that contains terminal tertiary amine groups. Typical polyamines containing at least one tertiary amine and one primary amine or secondary amine that are used include N,N-dimethylaminopropylamine, aminopropylmonomethylethanolamine, N,N-diethylaminopropylamine, aminoethylethanolamine, N-aminoethylpiperazine, aminopropylmorpholine, tetramethyldipropylenetriamine and diketimine (a reaction product of 1 mole diethylenetriamine and 2 moles methyl isobutyl ketone). N,N-dimethylaminopropylamine is particularly preferred. Typically after the adduct with cyclic carbonate terminal groups described above is formed, the amine that contains primary or secondary amine functions in addition to the tertiary amine functions, and additional solvent are added to the reaction solution and the reaction is continued at elevated temperature until all the cyclic carbonate groups are reacted and converted to terminal tertiary amine groups. The amount of polyamine required will vary from case to case depending upon the desired degree of water solubility needed for the particular end use application. Generally, an equimolar amount of amine to cyclic carbonate is used, however a slight excess of carbonate is acceptable.

To further enhance crater resistance property, a portion of the polyamine used in the above reaction can be replaced with an amino functional alkylalkoxysilane compound, which is also reactive with the terminal cyclic carbonate groups and capable of converting these groups to terminal alkoxy silane groups. Typical useful aminoalkylalkoxysilane compounds are gamma-aminopropyltriethoxysilane, gamma-aminopropyltrimethoxysilane, and N-(2-aminoethyl)-3-aminopropyltrimethoxysilane. Gamma-aminopropyltrimethoxysilane is particularly preferred. In a preferred embodiment, blends of polyamines and aminoalkylalkoxysilanes are used. Preferably, in these blends about 5 to 40 mole % of the polyamine is substituted with an aminoalkylalkoxysilane, with about 5 to 20 mole % substitution being especially preferred.

The resultant anti-crater additives that are produced above are of low to intermediate molecular weight, having a number average molecular weight of about 1,000-10,000, preferably –2000-6000, as determined by GPC (Gel Permeation Chromatography) using polystyrene as the standard.

The additive is emulsified in water with an organic or inorganic acid (mentioned below) to fully or partially neutralize the tertiary amine functionality. The anti-crater additive can then be added to the electrocoating composition at almost any time. It can be added to the principal emulsion, to the bath or to the pigment paste. In the pigment paste, pigment is ground with a resin which can be the anticrater agent which also functions as a pigment dispersing resin.

Most principal emulsions used in an electrocoating composition comprise an aqueous emulsion of a binder of an epoxy amine adduct blended with a crosslinking agent which has been neutralized with an acid to form a water soluble product.

The anti-crater agent is potentially usable with a variety of different cathodic electrocoat resins, but the preferred resin is the typical epoxy-amine adduct of the prior art. These resins are generally disclosed in U.S. Pat. No. 4,419,467 which is incorporated by reference.

Typical acids used to neutralize the epoxy-amine adduct as well as the additive to form water dispersible cationic groups are lactic acid, acetic acid, formic acid, sulfamic acid and the like.

Preferred crosslinkers for the above resins are also well known in the prior art. These are aliphatic, cycloaliphatic and aromatic isocyanates including any of those mentioned above such as hexamethylene diisocyanate, cyclohexamethylene diisocyanate, toluene diisocyanate, methylene diphenyl diisocyanate and the like. These isocyanates are pre-reacted with a blocking agent such as oximes, alcohols, or caprolactams which block the isocyanate functionality, i.e., the crosslinking functionality. Upon heating the blocking agents separate, thereby providing a reactive isocyanate group and crosslinking occurs. Isocyanate crosslinkers and blocking agents are well known in the prior art and also are disclosed in the aforementioned U.S. Pat. No. 4,419,467.

The cathodic binder of the epoxy amine adduct and the blocked isocyanate are the principal resinous ingredients in the electrocoating composition and are usually present in amounts of about 30 to 50% by weight of solids of the composition. To form an electrocoating bath, the solids are generally reduced with an aqueous medium.

Besides the binder resin described above, the electrocoating composition usually contains pigment which is incorporated into the composition in the form of a pigment paste. The pigment paste is prepared by grinding or dispersing a pigment into a grinding vehicle and optional ingredients such as wetting agents, surfactants, and defoamers. Any of the pigment grinding vehicles that are well known in the art can be used or the anticrater agent of this invention can be used. After grinding, the particle size of the pigment should be as small as practical, generally, the particle size is about 6-8 using a Hegman grinding gauge.

Pigments which can be used in this invention include titanium dioxide, carbon black, iron oxide, clay and the like. Pigments with high surface areas and oil absorbencies should be used judiciously because these can have an undesirable affect on coalescence and flow of the electrodeposited coating.

The pigment to binder weight ratio is also important and should be preferably less than 0.5:1, more preferably less than 0.4:1, and usually about 0.2 to 0.4:1. Higher pigment to binder weight ratios have been found to adversely affect coalescence and flow.

The coating compositions of the invention can contain optional ingredients such as wetting agents, surfactants, defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0.1 to 20 percent by weight of binder solids of the composition.

Optionally, plasticizers can be used to promote flow. Examples of useful plasticizers are high boiling water immiscible materials such as ethylene or propylene oxide adducts of nonyl phenols or bisphenol A. Plasticizers are usually used at levels of about 0.1 to 15 percent by weight resin solids.

The electrocoating composition of this invention is an aqueous dispersion. The term "dispersion" as used within the context of this invention is believed to be a two-phase translucent or opaque aqueous resinous binder system in which the binder is in the dispersed phase and water the continuous phase. The average particle size diameter of the binder phase is about 0.1 to 10 microns, preferably, less than 5 microns. The concentrations of the binder in the aqueous medium in general is not critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

The following example illustrates the invention. All parts and percentages are on a weight basis unless otherwise indicated.

EXAMPLE

Preparation of Anti-Crater Additive I

A highly branched water-reducible polyester was prepared by charging 266 parts dodecenylsuccinic anhydride, 125 parts glycerin carbonate and 3 parts triphenylphosphine into a suitable reaction vessel and heated to 116° C. under a nitrogen blanket. The reaction was held at 132° C. until an acid number of 132 to 136 was achieved. 226 Parts 2-ethylhexyl monoglycidyl ether and 3 parts triphenylphosphine were added and held at 132° C. until an acid number of 0 to 3 was achieved. 266 Parts dodecenylsuccinic anhydride and 1 part triphenylphosphine were added and held at 132° C. until an acid number of 56 to 62 was achieved. Then 108 parts xylene were added and the reaction temperature was dropped to 116° C. 130 parts Mondur® MR (polymeric MDI) was slowly charged into the reaction vessel. The reaction mixture was held at 116° C. until all of the isocyanate was reacted as indicated by infrared scan. 102 Parts dimethylaminopropylamine was added and held at 116° C. for one hour. Thereafter the reaction mixture was dripped into a mixture of 2347 parts deionized water and 163 parts lactic acid (46% concentration) and mixed for 30 minutes. The resulting resin solution had a nonvolatile of 30% in water.

Preparation of Anti-Crater Additive II

A highly branched water-reducible polyester was prepared by charging 266 parts dodecenylsuccinic anhydride, 125 parts glycerin carbonate and 3 parts triphenylphosphine into a suitable reaction vessel and heated to 116° C. under a nitrogen blanket. The reaction was held at 132° C. until an acid number of 132 to 136 was achieved. 181 Parts 2-ethylhexyl monoglycidyl ether, 47 parts gamma-glycidoxypropyltrimethoxysilane and 3 parts triphenylphosphine were added and held at 132° C. until an acid number of 0 to 3 was achieved. 266 Parts dodecenylsuccinic anhydride and 1 part triphenylphosphine were added and held at 132° C. until an acid number of 56 to 62 was achieved. Then 108 parts xylene was added and the reaction temperature was dropped to 116° C. 130 Parts Mondur® MR (polymeric MDI) was slowly charged into the reaction vessel. The reaction mixture was held at 116° C. until all of the isocyanate was reacted as indicated by infrared scan. 87 Parts dimethylaminopropylamine and 33 parts aminopropyltrimethoxysilane were added and held at 116° C. for one hour. The reaction mixture was then dropped into a mixture of 2369 parts deionized water and 143 parts lactic acid (46% concentration) and mixed for 30 minutes. The resulting resin solution had a nonvolatile of 30% in water.

Preparation of Crosslinking Resin Solution

An alcohol blocked polyisocyanate crosslinking resin solution was prepared by charging 317.14 parts of Mondur® MR (polymeric MDI), 105.71 parts of methyl isobutyl ketone and 0.06 parts of dibutyl tin dilaurate into a suitable reaction vessel and heated to 37° C. under a nitrogen blanket. A mixture of 189.20 parts of propylene glycol mono methyl ether and 13.24 parts of trimethylolpropane was slowly charged into the reaction vessel while maintaining the reaction mixture below 93° C. The reaction mixture was then held at 110° C. until essentially all of the isocyanate was reacted as indicated by infrared scan of the reaction mixture. 3.17 Parts of butanol and 64.33 parts of methyl isobutyl ketone were then added. The resulting resin solution had a nonvolatile content of 30% in deionized water.

Preparation of Chain Extended Polyepoxide Emulsion

The following ingredients were charged into a suitable reaction vessel: 520 parts of Epon 828® (Epoxy resin of diglycidyl ether of bisphenol A having an epoxy equivalent weight of 188); 151 parts bisphenol A; 190 parts ethoxylated bisphenol A having a hydroxy equivalent weight of 247 (Synfac® 8009), 44 parts xylene and 1 part dimethyl benzyl amine. The resulting reaction mixture was heated to 160° C. under nitrogen blanket and held at room temperature for 1 hour. 2 parts dimethyl benzyl amine were added and the mixture was held at 147° C. until an epoxy equivalent weight of 1050 was obtained. When the reaction mixture cooled to 149° C., then 797 parts of crosslinker resin solution (from above) was added. When the reaction temperature cooled to 107° C., 58 parts of diketimine (reaction product of diethylenetriamine and methyl isobutyl ketone having a nonvolatile content of 73%) and 48 parts of methyl ethanol amine were added. The temperature of the resulting mixture rose and was held at 120° C. for 1 hour and then dispersed in an aqueous medium of 1335 parts deionized water and 61 parts lactic acid (88% lactic acid in deionized water). An additional 825 parts of deionized water was added. The emulsion was kept agitated until the methyl isobutyl ketone was evaporated. The resulting resin emulsion had a nonvolatile content of 38%.

Preparation of Quaternizing Agent

The quaternizing agent was prepared by adding 87 parts dimethylethanolamine to 320 parts 2-ethylhexanol half-capped toluene diisocyanate in the reaction vessel at room temperature. An exothermic reaction occurred and the reaction mixture was stirred for one hour at 80° C. 118 parts aqueous lactic acid solution (75% nonvolatile content) was then added followed by the addition of 39 parts 2-butoxyethanol. The reaction mixture was held for about one hour at 65° C. with constant stirring to form the quaternizing agent.

Preparation of Pigment Grinding Vehicle

The pigment grinding vehicle was prepared by charging 710 parts Epon® 828 (diglycidyl ether of bisphenol A having an epoxide equivalent weight of 188) and 290 parts bisphenol A into a suitable vessel under nitrogen blanket and heated to 150° C.-160° C. to initiate an exothermic reaction. The exothermic reaction was continued for about one hour at 150° C.-160° C. The reaction mixture was then cooled to 120° C. and 496 part of 2-ethylhexanol half capped toluene diisocyanate was added. The temperature of the reaction mixture was held at 110° C.-120° C. for one hour, followed by the addition of 1095 parts of 2-butoxyethanol, the reaction mixture was then cooled to 85° C.-90° C. and then 71 parts of deionized water was added followed by the addition of 496 parts quarternizing agent (prepared above). The temperature of the reaction mixture was held at 85° C.-90° C. until an acid value of about 1 was obtained.

Preparation of Pigment Paste

| Ingredient | Parts by Weight |
| --- | --- |
| Pigment grinding vehicle (prepared above) | 597.29 |
| Deionized Water | 1140.97 |
| Titanium dioxide pigment | 419.28 |
| Aluminum silicate pigment | 246.81 |
| Carbon black pigment | 15.27 |
| Barium sulfate pigment | 416.38 |
| Dibutyl tin oxide | 164.00 |

The above ingredients were mixed in a suitable container until a homogenous mixture was formed. They were then dispersed by charging the mixture into a Eiger mill and then grinding until a Hegman reading of 7 or greater was obtained.

Preparation of Electrocoating Baths

| | Parts by Weight | | |
| --- | --- | --- | --- |
| Ingredient | Bath I | Bath II | Bath III |
| Emulsion | 1550.00 | 1605.00 | 1605.00 |
| Deionized Water | 1999.00 | 1998.00 | 1998.00 |
| Pigment Paste | 356.00 | 356.00 | 356.00 |
| Anticrater Agent | 95.00* | 42.00** | 42.00*** |
| Total | 4000.00 | 4000.00 | 4000.00 |

*The anticrater agent used in Bath I comprised a conventional anticrater agent which is the reaction product of Jeffamine ® D2000 (polyoxyalkylene diamine) and Epon ® 1001 epoxy resin.
**The anticrater agent used in Bath II comprised the new anticrater additive I prepared above.
***The anticrater agent used in Bath III comprised the new anticrater additive II prepared above.

Each of the cationic electrocoating baths were prepared by mixing the ingredients together, and then ultrafiltering the mixtures. Each bath was electrocoated at 240 to 280 volts to obtain 0.8-1.0 mils (20.23-25.4 microns). The baths were then compared for crater resistance and PVC sealer adhesion. Bath I served as the control.

ASPP blow out crater test is used to test each bath. Crater resistance was rated according to the following rating scale of A-E:

A-0-10% defects
B-11-20% defects
C-21-40% defects
D-41-80% defects
E-Greater than 80% defects The crater resistant rating for Bath I (control) was D. Baths II rated C and bath III rated B on crater resistance.

Crater resistance of each bath was also measured by an oil contamination test. In order to measure carter resistance under the oil contamination test, 20 ppm of Quicker oil was added to each bath and mixed for 24 hours under low agitation. Each bath was then electrocoated to obtain 0.8-1.0 mils film build. For oil contamination test, crater resistance was rated according to the following rating scale of 1 to 5:

1-less than 10 craters
2-10 to 20 craters
3-30 to 50 craters
4-50 to 100 craters
5-greater than 100 craters The oil contamination test rating for Bath I was 4, Bath II was 2 and Bath III was 1.

To conduct a PVC sealer adhesion test, electrocoated panels were first prepared by electrocoating cold-rolled steel substrates with electrocoating baths prepared above at 240V to 280V coating voltage for obtaining 0.8-0.9 mils film thickness. The uncured E-coat panels were then baked in electric-oven at 182° C. for 10 minutes metal temperature. A commercially available PVC sealer (supplied by Eftec company under the trade name Togotec® PB209V1) was applied on an electric-oven baked electrocoated panel. The thickness of the PVC sealer was 1 mm and baked at 140° C. for 10 minutes metal temperature. The adhesion was rated pass if no sealer can be pulled from electrocoated substrate and fail if no sealer can adhere to e-coated substrate.

The PVC sealer adhesion rating for Bath I was fail, Bath II was pass and Bath III was pass.

Various other modifications, alterations, additions or substitutions of the compositions and methods of this invention will be apparent to those skilled in the art without departing from the spirit and scope of this invention. This invention is not limited by the illustrative embodiments set forth herein, but rather is defined by the following claims.

We claim:

1. An improved cathodic electrocoating composition, comprising an aqueous carrier having dispersed therein a film forming binder comprising an epoxy-amine adduct and a blocked polyisocyanate crosslinking agent;

wherein the improvement is the incorporation of an anti-crater agent comprising a highly branched water-reducible polyester which is the reaction product of:
   (a) a hydroxy cyclic carbonate;
   (b) an aliphatic polycarboxylic acid anhydride;
   (c) optionally, a monofunctional epoxy resin;
   (d) a bridging agent selected from the group consisting of di and higher polyisocyanate resin;
   (e) a polyamine compound selected from the group consisting of
      (i) a polyamine having at least one free tertiary amine and one primary or secondary amine group; and
      (ii) a combination of a polyamine having at least one free tertiary amine and one primary or secondary amine group, and an aminoalkylalkoxysilane,
   which reaction product is neutralized in the presence of acid and water to convert the tertiary amine groups to water-dilutible groups.

2. The composition of claim 1, wherein the aliphatic polycarboxylic acid anhydride contains a $C_4$ to $C_{18}$ linear, branched or cycloaliphatic side chain.

3. The composition of claim 1, wherein components (a)-(e) are reacted in any workable order.

4. The composition of claim 1, wherein components (a)-(e) are reacted in the order given.

5. A method for the preparation of a highly branched water-reducible polyester anti-crater agent said method comprising;
   (A) reacting a hydroxy cyclic carbonate with an aliphatic polycarboxylic acid anhydride to form an adduct with a primary carboxyl group at one terminus and a cyclic carbonate at the other terminus;
   (B) reacting the carboxyl group of said adduct with a bridging agent, said bridging agent is selected from the group consisting of di- and higher polyisocyanate resin, to form a di- or higher adduct with terminal cyclic carbonate groups;
   (C) reacting the terminal cyclic carbonate groups with a polyamine, said polyamine selected from the group consisting of (i) a polyamine having at least one free tertiary amine and one primary or secondary amine group and (ii) a combination of (i) and an aminoalkylaikoxysilane, resulting in an adduct with terminal tertiary amine groups; and
   (D) fully or partially neutralizing said terminal tertiary amine groups in the presence of acid and water.

6. The method of claim 5, wherein prior to step (B), the adduct of step (A) is further reacted with a monofunctional epoxy resin to form a chain extended adduct containing a hydroxyl group having an acid number of less than 20 mg KOH/g; and wherein said chain extended adduct is subsequently reacted with and aliphatic polycarboxylic acid anhydride to form a chain extended adduct containing an acid group having an acid number greater than 40mg KOH/g.

7. A method of preparing a cathodic electrocoating composition comprising the following steps in any workable order
   (a) preparing an epoxy-amine adduct;
   (b) preparing a blocked polyisocyanate crosslinking agent;
   (c) blending the epoxy-amine adduct with the blocked polyisocyanate crosslinking agent;
   (d) neutralizing the epoxy-amine adduct with an organic acid to form an emulsion;
   (e) blending the emulsion with a pigment paste; and
   (f) incorporating an additive agent into the electrocoating composition;
   wherein the additive agent consists essentially of a highly branched water-reducible polyester resin which is the reaction product of (A) a hydroxy cyclic carbonate; (B) an aliphatic polycarboxylic acid anhydride; (C) optionally, a monofunctional epoxy resin; (D) a bridging agent selected from the group consisting of di- and higher polyisocyanate resin; (E) a polyamine selected from the group consisting of (i) a polyamine having at least one free tertiary amine and one primary or secondary group, and (ii) a combination of (i) and an aminoalkylalkoxysilane; and wherein said reaction product is fully or partially neutralized in the presence of acid and water to convert the tertiary amine groups to water-dilutable groups.

* * * * *